US011196341B2

United States Patent
Hamada et al.

(10) Patent No.: US 11,196,341 B2
(45) Date of Patent: Dec. 7, 2021

(54) SWITCHING POWER SUPPLY WITH CONTROLLED SWITCHING FREQUENCY VARIATION RANGE

(71) Applicant: FDK CORPORATION, Tokyo (JP)

(72) Inventors: Kenji Hamada, Tokyo (JP); Toshio Shibata, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 16/771,351

(22) PCT Filed: Sep. 25, 2018

(86) PCT No.: PCT/JP2018/035423
§ 371 (c)(1),
(2) Date: Jun. 10, 2020

(87) PCT Pub. No.: WO2019/123751
PCT Pub. Date: Jun. 27, 2019

(65) Prior Publication Data
US 2020/0343814 A1 Oct. 29, 2020

(30) Foreign Application Priority Data
Dec. 20, 2017 (JP) .............................. JP2017-244203

(51) Int. Cl.
*H02M 3/156* (2006.01)
*H02M 3/335* (2006.01)

(52) U.S. Cl.
CPC ........ *H02M 3/156* (2013.01); *H02M 3/33507* (2013.01)

(58) Field of Classification Search
None
See application file for complete search history.

(56) References Cited

U.S. PATENT DOCUMENTS 9,694,694 B2 * 7/2017 Hatanaka .............. H02M 3/158
2010/0097829 A1 * 4/2010 Uno ........................ H02M 1/44
363/124

(Continued)

FOREIGN PATENT DOCUMENTS

JP 2013005488 A 1/2013
JP 201421687 A 11/2014

(Continued)

OTHER PUBLICATIONS

International Search Report and Written Opinion dated Dec. 4, 2018, for corresponding PCT Application No. PCT/JP2018/035423.

*Primary Examiner* — Jeffrey A Gblende
(74) *Attorney, Agent, or Firm* — Kinney & Lange, P.A.

(57) ABSTRACT

The switching power supply is provided with a voltage converter including a switching element for inputting a voltage from an input terminal, and has a spread spectrum function of varying a switching frequency in the switching element within a predetermined variation range. The switching power supply has a frequency setting unit that sets the variation range of the switching frequency and raises a lower limit value of the set variation range when a value of the voltage input from the input terminal is equal to or more than a predetermined threshold, and a signal generator that generates a control signal for driving the switching element by varying the switching frequency within the variation range set by the frequency setting unit.

5 Claims, 3 Drawing Sheets

(56) References Cited

U.S. PATENT DOCUMENTS

| | | | |
|---|---|---|---|
| 2012/0194162 A1 | 8/2012 | Lin et al. | |
| 2013/0234531 A1* | 9/2013 | Budgett | H04B 5/0075 |
| | | | 307/104 |
| 2017/0331364 A1* | 11/2017 | Giguere | H02M 3/33507 |
| 2019/0157976 A1* | 5/2019 | Xie | H02M 3/158 |

FOREIGN PATENT DOCUMENTS

| | | |
|---|---|---|
| JP | 2015228761 A | 12/2015 |
| JP | 2016082702 A | 5/2016 |
| JP | 2016226216 A | 12/2016 |

\* cited by examiner

SWITCHING POWER SUPPLY WITH CONTROLLED SWITCHING FREQUENCY VARIATION RANGE

CROSS-REFERENCE TO RELATED APPLICATION(S)

The present application is the national phase of PCT Application No. PCT/JP2018/035423 filed on Sep. 25, 2018, which in turn claims priority to Japanese Application No. 2017-244203 filed on Dec. 20, 2017, the entire disclosures of which are incorporated by reference herein.

BACKGROUND

Technical Field

The present disclosure relates to a switching power supply having a spread spectrum function.

Background Art

In a switching power supply, the direction of a flowing current is switched in accordance with on/off control of a switching element (for example, a transistor) included in the switching power supply. At this time, very large switching noise occurs in the switching power supply. The switching noise becomes electromagnetic field radiation noise to the outside, causing electromagnetic interference in surrounding electronic devices. Therefore, to suppress occurrence of switching noise is a problem in the above switching power supply.

Incidentally, in the switching power supply, spectrum spreading is performed to suppress occurrence of the switching noise. Spectrum spreading is a technique that reduces the influence of noise and other factors on signals by varying a switching frequency within a predetermined variation range so that one signal is spread to a plural number of signals corresponding to a plural number of switching frequencies. When the switching frequency is varied within a predetermined variation range, the wider the predetermined variation range is, the more effective the spectrum spreading is, and the better effect of suppressing occurrence of switching noise is exhibited.

PRIOR ART DOCUMENT

Patent Document

Patent Document 1: Japanese Patent Laid-Open No. 2015-228761

SUMMARY

However, the wider the variation range of the switching frequency is, more likely the following problems are to occur. For example, when a voltage input to the switching power supply is high and the switching frequency is low, an output ripple voltage becomes large. The increase in the output ripple voltage may cause malfunction or damage in some apparatuses that are powered by a voltage output from a switching power supply. Further, when the switching frequency is high, a switching loss of a switching element increases, resulting in a deteriorated conversion efficiency. Deterioration of the conversion efficiency leads to an increase in current consumption.

The present disclosure has been made in consideration of such circumstances, and an object thereof is to provide a switching power supply that is capable of reducing an output ripple voltage while suppressing occurrence of switching noise.

In order to achieve the above object, an aspect of the present disclosure is directed to a switching power supply provided with a voltage converter including a switching element for inputting a voltage from an input terminal and having a spread spectrum function of varying a switching frequency in the switching element within a predetermined variation range, comprising a frequency setting unit that sets the variation range of the switching frequency and raises a lower limit value of the set variation range when a value of the voltage input from the input terminal is equal to or more than a predetermined threshold, and a signal generator that generates a control signal for driving the switching element by varying the switching frequency within the variation range set by the frequency setting unit.

An output ripple voltage becomes larger as the voltage input from the input terminal to the voltage converter is higher and the switching frequency is lower. The frequency setting unit in the aspect of the present disclosure raises a lower limit value of the set variation range of the switching frequency when a value of the voltage input from the input terminal to the voltage converter is equal to or more than a predetermined threshold. Thereby, the switching power supply according to the aspect of the present disclosure can reduce the output ripple voltage.

Thus, the switching power supply according to the aspects of the present disclosure can reduce the output ripple voltage while suppressing occurrence of switching noise.

DETAILED DESCRIPTION

Hereinafter, a switching power supply according to an embodiment of the present disclosure will be described with reference to the drawings. It should be noted that the present embodiment is not limited to the details described below, and can be arbitrarily changed and implemented as long as the gist thereof is not changed. Further, all the drawings used for describing the embodiment schematically show the components, with partial emphasis, enlargement, reduction, omission, or the like performed in order to deepen understanding, and may not accurately represent the scale, shape, and the like of the components.

Figure 1:
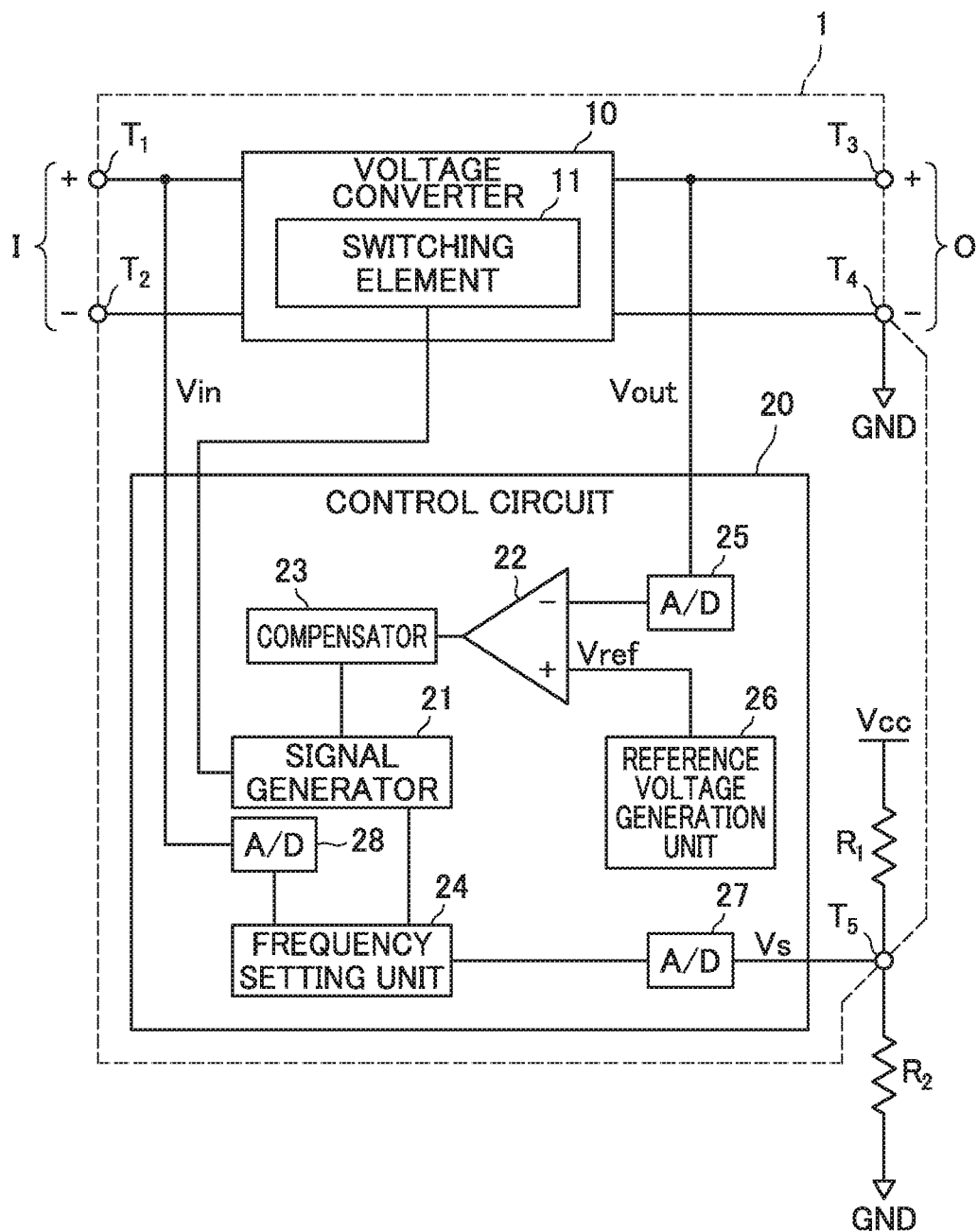
FIG. 1 is a block diagram showing a switching power supply according to the present embodiment.

FIG. 1 is a block diagram showing a switching power supply 1 according to the present embodiment. The switching power supply 1 shown in FIG. 1 has a spread spectrum function of varying a switching frequency in a switching element 11 described later within a predetermined variation range.

The switching power supply 1 is a power supply that, for example, converts a voltage (input voltage) Vin input from an input terminal I having a first positive electrode terminal $T_1$ and a first negative electrode terminal $T_2$, and outputs it from an output terminal O having a second positive electrode terminal $T_3$ and a second negative electrode terminal $T_4$. The second negative electrode terminal $T_4$ is connected to a ground GND (Ground Fault). Further, the switching power supply 1 according to the present embodiment is provided with a pull-up resistor $R_1$ and a control terminal $T_5$. The pull-up resistor $R_1$ is connected between a frequency setting unit 24 of a control circuit 20 described later and a constant voltage source Vcc that supplies a power supply voltage to the control circuit 20. The control terminal $T_5$ is provided between the pull-up resistor $R_1$ and the frequency setting unit 24. To the control terminal $T_5$, for example, an external apparatus that receives supply of a voltage output from a voltage converter 10 is connected.

The switching power supply 1 shown in FIG. 1 has a voltage converter 10 and a control circuit 20. The voltage converter 10 converts the input voltage Vin and outputs it from the output terminal O. The voltage converter 10 includes the switching element 11 serving as a trigger for inputting the input voltage Vin. Here, the voltage converter 10 in the present embodiment is, for example, an insulation type step-down converter, a non-insulation type step-down converter, an insulation type step-up converter, a non-insulation type step-up converter, a non-insulation type bidirectional converter, or an insulation type bidirectional converter, and is provided with a component for configuring any of the converters.

The control circuit 20 outputs a control signal for driving the switching element 11. The control circuit 20 in the present embodiment is, for example, a microcomputer. The control circuit 20 is connected with the constant voltage source Vcc through the pull-up resistor $R_1$. The control circuit 20 in the present embodiment has a signal generator 21, a differential amplifier 22, a compensator 23, and a frequency setting unit 24.

The signal generator 21 generates a control signal for driving the switching element 11. The control signal output from the signal generator 21 is a pulse signal that repeats an on period or an off period at a constant cycle. The signal generator 21 sets, for example, a pulse width of the control signal per one cycle in accordance with a duty ratio calculated by the compensator 23 described later. At this time, the signal generator 21 varies the switching frequency within a variation range set by the frequency setting unit 24 described later.

A voltage (output voltage) Vout output from the voltage converter 10 to the output terminal O is input to the differential amplifier 22 through an analog/digital converter (A/D) 25. Further, the differential amplifier 22 amplifies a difference between the output voltage Vout input from the output terminal O and a reference voltage Vref output from a reference voltage generation unit 26. It should be noted that a value of the reference voltage Vref output from the reference voltage generation unit 26 is, for example, an ideal output value of the output voltage Vout.

The compensator 23 calculates a control amount of the switching element 11 based on the difference between the output voltage Vout and the reference voltage Vref amplified by the differential amplifier 22. In other words, the compensator 23 calculates a duty ratio of the control signal for driving the switching element 11 based on the difference between the output voltage Vout and the reference voltage Vref. The compensator 23 calculates the duty ratio so that the difference approaches zero, for example, by PI (proportional integration) calculation. The reason for calculating the duty ratio in such a manner that the difference approaches zero is to make the value of the output voltage Vout constant even when the value of the input voltage Vin changes.

The frequency setting unit 24 sets the variation range of the switching frequency in the switching element 11. For example, a voltage Vs generated at the control terminal $T_5$ is input to the frequency setting unit 24 through the analog/digital converter (A/D) 27. The frequency setting unit 24 sets the variation range of the switching frequency in accordance with the voltage Vs generated at the control terminal $T_5$. Here, in the present embodiment, the value of the voltage Vs generated at the control terminal $T_5$ is calculated from a value of a resistor $R_2$ that is included in the external apparatus connected to the control terminal $T_5$, a value of the pull-up resistor $R_1$, and a value of the power supply voltage of the constant voltage source Vcc.

Figure 2:
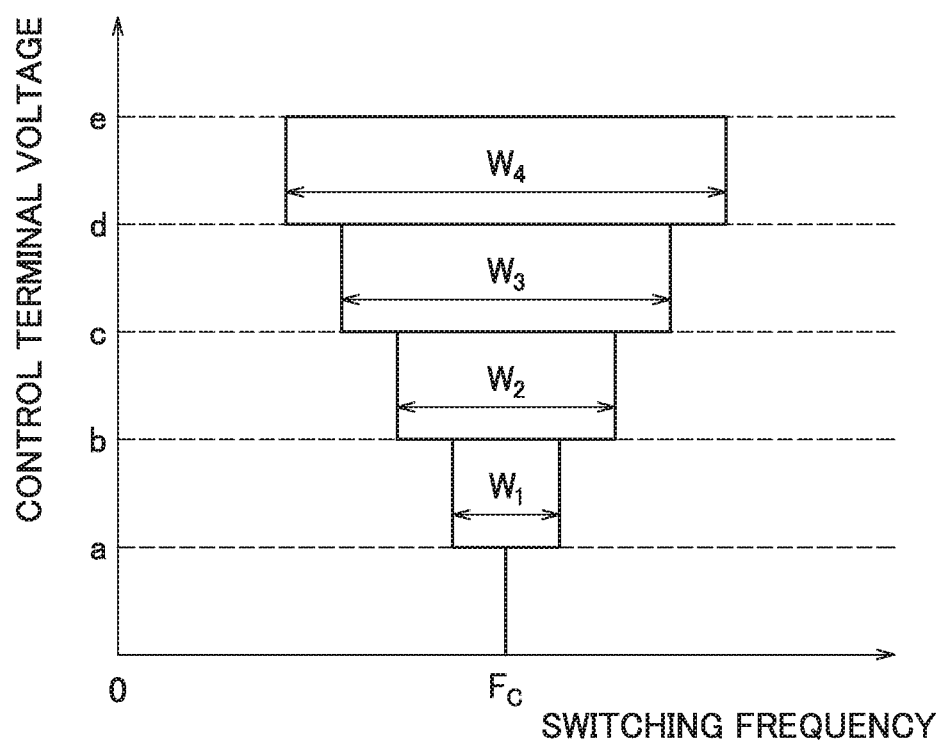
FIG. 2 is a diagram showing variation ranges of switching frequencies in accordance with a voltage generated at a control terminal.

FIG. 2 is a diagram showing variation ranges of the switching frequencies in accordance with the voltage Vs generated at the control terminal $T_5$. The horizontal axis in FIG. 2 represents a switching frequency and the vertical axis in FIG. 2 represents a voltage Vs generated at the control terminal $T_5$. As shown in FIG. 2, the frequency setting unit 24 sets the variation range of the switching frequency by broadening it stepwise in accordance with the voltage Vs generated at the control terminal $T_5$.

For example, as shown in FIG. 2, when the voltage Vs generated at the control terminal $T_5$ is between a voltage value a and a voltage value b, the variation range of the switching frequency is assumed to be $W_1$. Further, when the voltage Vs generated at the control terminal $T_5$ is between the voltage value b and a voltage value c, the variation range of the switching frequency is assumed to be $W_2$. Further, when the voltage Vs generated at the control terminal $T_5$ is between the voltage value c and a voltage value d, the variation range of the switching frequency is assumed to be $W_3$. Further, when the voltage Vs generated at the control terminal $T_5$ is between the voltage value d and a voltage value e, the variation range of the switching frequency is assumed to be $W_4$.

As shown in FIG. 2, the frequency setting unit 24 sets the variation range of the switching frequency by broadening it stepwise in accordance with the voltage Vs generated at the control terminal $T_5$. Here, the value Vs of the voltage input from the control terminal $T_5$ is, as described above, calculated from the value of the resistor $R_2$ that is included in the external apparatus connected to the control terminal $T_5$, the value of the pull-up resistor $R_1$, and the value of the power supply voltage of the constant voltage source Vcc. In other words, the value of the voltage Vs generated at the control terminal $T_5$ is changed by the external apparatus connected to the control terminal $T_5$. That is, the frequency setting unit 24 can set the variation range of the switching frequency in accordance with the external apparatus connected to the control terminal $T_5$.

Here, the frequency setting unit 24 sets the variation ranges of the switching frequencies, with a predetermined switching frequency $F_c$ as a central frequency, to frequencies lower and higher than the predetermined switching frequency $F_c$ along the same frequency bandwidths. The frequency setting unit 24 in the present embodiment may set the variation range of the switching frequency closer to a low switching frequency band in consideration of a switching loss of the switching element 11 generated at high switching frequencies.

Further, the frequency setting unit 24 does not set the variation range of the switching frequency when the value of the voltage Vs generated at the control terminal $T_5$ is less than a predetermined threshold (for example, the voltage value as shown in FIG. 2). That is, in the signal generator 21, the switching frequency is not varied and the spectrum spreading is not performed. The reason for this is, for example, if the frequency of the other device in the switching power supply 1 and the variation range of the switching frequency are overlapped, malfunction may be caused due to interference.

Further, the voltage Vin input from the input terminal I to the voltage converter 10 is input to the frequency setting unit 24 through the analog/digital converter (A/D) 28. The frequency setting unit 24 raises a lower limit value of the set variation range of the switching frequency when the value of the voltage Vin input from the input terminal I to the voltage converter 10 is equal to or more than a predetermined threshold.

Figure 3:
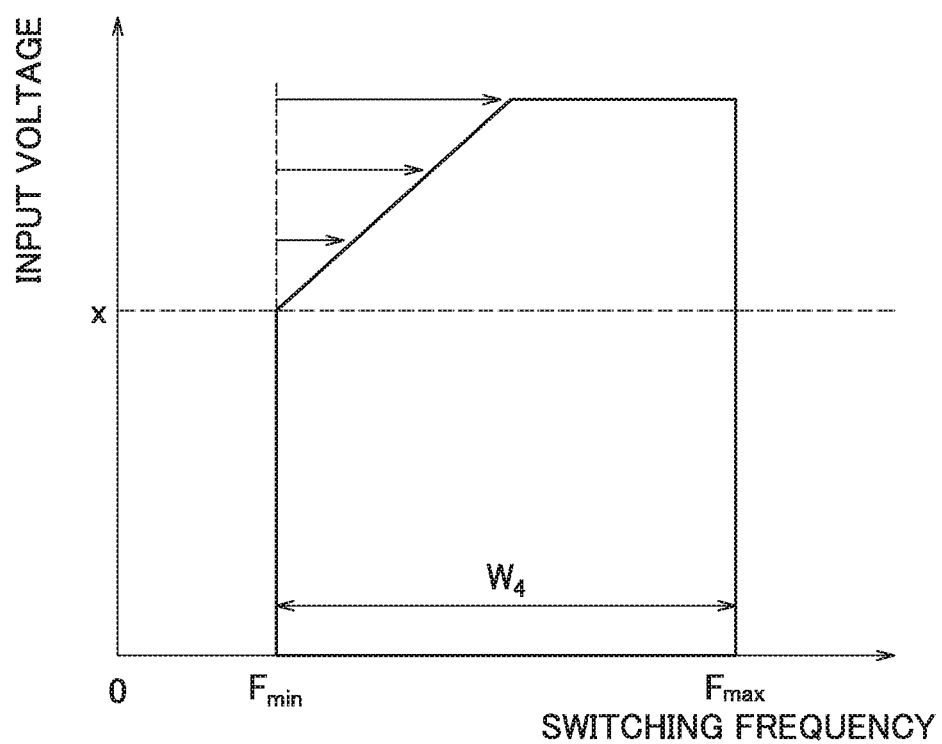
FIG. 3 is a diagram showing a variation range of a switching frequency in accordance with a voltage input from an input terminal.

FIG. 3 is a diagram showing a variation range of the switching frequency in accordance with the voltage Vin input from the input terminal I. Here, it is assumed that the voltage Vs generated at the control terminal $T_5$ is between the voltage value d and the voltage value e, and the variation range of the switching frequency is $W_4$. The frequency setting unit 24 raises a lower limit value $F_{min}$ of the set variation range $W_4$ of the switching frequency when the value of the voltage Vin input from the input terminal I is equal to or more than a predetermined threshold (for example, a voltage value x shown in FIG. 3). Further, along with the increase of the value of the voltage Vin input from the input terminal I, the frequency setting unit 24 raises the lower limit value $F_{min}$ of the variation range $W_4$ of the switching frequency used as a reference.

Here, the output ripple voltage becomes larger as the voltage Vin input from the input terminal I to the voltage converter 10 is higher and the switching frequency is lower. The frequency setting unit 24 in the present embodiment raises a lower limit value of the set variation range of the switching frequency when the value of the voltage Vin input from the input terminal I to the voltage converter 10 is equal to or more than a predetermined threshold. Thereby, the switching power supply 1 according to the present embodiment can reduce the output ripple voltage.

Further, when the voltage converter 10 is an insulation type converter, the higher the voltage Vin input from the input terminal I to the voltage converter 10 is and the lower the switching frequency is, more likely magnetic saturation is to occur in a transformer (trans) included in the voltage converter 10, which may result in damage of the switching power supply 1. The frequency setting unit 24 in the present embodiment raises a lower limit value of the set variation range of the switching frequency when the value of the voltage Vin input from the input terminal I to the voltage converter 10 is equal to or more than a predetermined threshold. Thereby, the switching power supply 1 according to the present embodiment can prevent magnetic saturation of the transformer.

(Overview)

As described above, the switching power supply 1 according to the present embodiment is provided with the voltage converter 10 including the switching element 11 for inputting the voltage Vin from the input terminal I, and has the spread spectrum function of varying the switching frequency in the switching element 11 within a predetermined variation range. The switching power supply 1 has the frequency setting unit 24 that sets the variation range of the switching frequency and raises a lower limit value of the set variation range when a value of the voltage Vin input from the input terminal I is equal to or more than a predetermined threshold, and the signal generator 21 that generates a control signal for driving the switching element 11 by varying the switching frequency within the variation range set by the frequency setting unit 24.

According to the configuration described above, in the switching power supply 1 according to the present embodiment, the frequency setting unit 24, as shown in FIG. 2, sets the variation range of the switching frequency by broadening it stepwisely in accordance with the voltage Vs generated at the control terminal $T_5$. Here, the value of the voltage Vs generated at the control terminal $T_5$ is, as described above, calculated from the value of the resistor $R_2$ that is included in the external apparatus connected to the control terminal $T_5$, the value of the pull-up resistor $R_1$, and the value of the power supply voltage of the constant voltage source Vcc. In other words, the value of the voltage Vs generated at the control terminal $T_5$ is changed by the external apparatus connected to the control terminal $T_5$. That is, the frequency setting unit 24 can set the variation range of the switching frequency in accordance with the external apparatus connected to the control terminal $T_5$.

Further, the output ripple voltage becomes larger as the voltage Vin input from the input terminal I to the voltage converter 10 is higher and the switching frequency is lower. The frequency setting unit 24 in the present embodiment raises a lower limit value of the set variation range of the switching frequency when the value of the voltage Vin input from the input terminal I to the voltage converter 10 is equal to or more than a predetermined threshold. Thereby, the switching power supply 1 according to the present embodiment can reduce the output ripple voltage.

Further, when the voltage converter 10 is an insulation type converter, the higher the voltage Vin input from the input terminal I to the voltage converter 10 is and the lower the switching frequency is, more likely magnetic saturation is to occur in the transformer included in the voltage converter 10, which may result in damage of the switching power supply 1. The frequency setting unit 24 in the present embodiment raises a lower limit value of the set variation range of the switching frequency when the value of the voltage Vin input from the input terminal I to the voltage converter 10 is equal to or more than a predetermined threshold. Thereby, the switching power supply 1 according to the present embodiment can prevent magnetic saturation of the transformer.

Thus, the switching power supply 1 according to the present embodiment can reduce the output ripple voltage while suppressing occurrence of switching noise.

Here, the frequency setting unit 24 sets the variation ranges of the switching frequencies, with the predetermined switching frequency $F_c$ as the central frequency, to frequencies lower and higher than the predetermined switching frequency $F_c$ along the same frequency bandwidths. The frequency setting unit 24 in the present embodiment may set the variation range of the switching frequency closer to a low switching frequency band in consideration of a switching loss of the switching element 11 generated at the high switching frequency. Thereby, the specifications of the switching power supply 1 according to the present embodiment can be changed in accordance with the requirements of the external apparatus connected to the control terminal T5.

It should be noted that in the switching power supply 1 according to the embodiment, the variation range of the switching frequency is changed by the value of the voltage Vs generated at the control terminal $T_5$. However, the switching power supply 1 according to the present embodiment is not limited to this. For example, in the switching power supply 1 according to the present embodiment, the variation range of the switching frequency may be constant irrespective of the value of the voltage Vs generated at the control terminal $T_5$.

Further, the switching power supply 1 according to the embodiment inputs the voltage Vs generated at the control terminal $T_5$ to the control circuit 20. However, the switching power supply 1 according to the present embodiment is not limited to this. For example, an external power supply may be connected to the switching power supply 1 according to the present embodiment, and an arbitrary voltage generated in the external power supply may be input to the control circuit 20.

It should be noted that the switching power supply 1 according to the present embodiment is not limited to the details described above, and various modifications can be made within the scope of the invention described in the claims.

<First Aspect of the Present Disclosure>

A first aspect of the present disclosure is a switching power supply provided with a voltage converter including a switching element for inputting a voltage from an input terminal, and having a spread spectrum function of varying a switching frequency in the switching element within a predetermined variation range, comprising a frequency setting unit that sets the variation range of the switching frequency and raises a lower limit value of the set variation range when a value of the voltage input from the input terminal is equal to or more than a predetermined threshold, and a signal generator that generates a control signal for driving the switching element by varying the switching frequency within the variation range set by the frequency setting unit.

The output ripple voltage becomes larger as the voltage input from the input terminal to the voltage converter is higher and the switching frequency is lower. The frequency setting unit according to the first aspect of the present disclosure raises a lower limit value of the set variation range of the switching frequency when the value of the voltage input from the input terminal to the voltage converter is equal to or more than a predetermined threshold. Thereby, the switching power supply according to the first aspect of the present disclosure can reduce the output ripple voltage.

Thus, the switching power supply according to the first aspect of the present disclosure can reduce the output ripple voltage while suppressing occurrence of switching noise.

<Second Aspect of the Present Disclosure>

A second aspect of the present disclosure is the switching power supply according to the first aspect of the present disclosure, further comprising a pull-up resistor connected between the frequency setting unit and a constant voltage source that supplies a power supply voltage, and a control terminal provided between the frequency setting unit and the pull-up resistor. The frequency setting unit of the switching power supply according to the second aspect of the present disclosure sets the variation range of the switching frequency in accordance with a value of a voltage generated at the control terminal, the voltage calculated from a value of a resistance that is included in an external apparatus connected to the control terminal, a value of the pull-up resistor, and a value of the power supply voltage.

In other words, the value of the voltage generated at the control terminal is changed by the external apparatus connected to the control terminal. That is, the frequency setting unit of the switching power supply according to the second aspect of the present disclosure can set the variation range of the switching frequency in accordance with the external apparatus connected to the control terminal.

Thus, the switching power supply according to the second aspect of the present disclosure can reduce the output ripple voltage while suppressing occurrence of switching noise.

<Third Aspect of the Present Disclosure>

A third aspect of the present disclosure is the switching power supply according to the second aspect of the present disclosure, in which the frequency setting unit does not set the variation range when the value of the voltage generated at the control terminal is less than a predetermined threshold. That is, in the signal generator, the switching frequency is not varied and the spectrum spreading is not performed.

Thus, the switching power supply according to the third aspect of the present disclosure can prevent overlapping of a frequency of the other device in the apparatus and the variation range of the switching frequency, which may result in malfunction due to interference.

<Fourth Aspect of the Present Disclosure>

A fourth aspect of the present disclosure is the switching power supply according to the second aspect of the present disclosure, in which the frequency setting unit sets the variation range of the switching frequency by broadening it stepwisely in accordance with the voltage generated at the control terminal, assumes the variation range set by broadening it stepwisely as a reference, and raises a lower limit value of the variation range used as the reference when the value of the voltage input from the input terminal is equal to or more than a predetermined threshold.

Here, the value of the voltage generated at the control terminal is calculated from the value of the resistor that is included in the external apparatus connected to the control terminal, the value of the pull-up resistor, and the value of the power supply voltage of the constant voltage source. In other words, the value of the voltage generated at the control terminal is changed by the external apparatus connected to the control terminal. That is, the frequency setting unit of the switching power supply according to the fourth aspect of the present disclosure can set the variation range of the switching frequency in accordance with the external apparatus connected to the control terminal.

Thus, the switching power supply according to the fourth aspect of the present disclosure can reduce the output ripple voltage while suppressing occurrence of switching noise.

<Fifth Aspect of the Present Disclosure>

A fifth aspect of the present disclosure is the switching power supply according to the second aspect of the present disclosure, in which the external apparatus receives supply of a voltage output from the voltage converter.

Thus, the switching power supply according to the fifth aspect of the present disclosure can reduce the output ripple voltage while suppressing occurrence of switching noise.

<Sixth Aspect of the Present Disclosure>

A sixth aspect of the present disclosure is the switching power supply according to the first aspect of the present disclosure, in which the frequency setting unit sets the variation range of the switching frequency in accordance with a value of an arbitrary voltage generated in the external power supply.

Thus, the switching power supply according to the sixth aspect of the present disclosure can reduce the output ripple voltage while suppressing occurrence of switching noise.

EXPLANATION OF REFERENCE SIGNS

1 Switching power supply
10 Voltage converter

11 Switching element
20 Control circuit
21 Signal generator
22 Differential amplifier
23 Compensator
24 Frequency setting unit
25, 27, 28 Analog/digital converter (A/D)
26 Reference voltage generation unit
I Input terminal
O Output terminal
$R_1$ Pull-up resistance
$R_2$ Resistance
$T_1$ First positive electrode terminal
$T_2$ First negative electrode terminal
$T_3$ Second positive electrode terminal
$T_4$ Second negative electrode terminal
$T_5$ Control terminal

What is claimed is:

1. A switching power supply provided with a voltage converter including a switching element for converting an input voltage from an input terminal to an output voltage at an output terminal, and having a spread spectrum function of varying a switching frequency in the switching element within a predetermined variation range, comprising:

a frequency setting unit that sets the variation range of the switching frequency and raises a lower limit value of the set variation range when a value of the input voltage from the input terminal is equal to or more than a first predetermined threshold, a signal generator that generates a control signal for driving the switching element by varying the switching frequency within the variation range set by the frequency setting unit, a pull-up resistor connected between the frequency setting unit and a constant voltage source that supplies a power supply voltage, and a control terminal provided between the frequency setting unit and the pull-up resistor, wherein the frequency setting unit sets the variation range of the switching frequency in accordance with a value of a voltage generated at the control terminal, the voltage being calculated from a value of a resistor that is included in an external apparatus connected to the control terminal, a value of the pull-up resistor, and a value of the power supply voltage.

2. The switching power supply according to claim 1, wherein the frequency setting unit does not set the variation range when the value of the voltage generated at the control terminal is less than a second predetermined threshold.

3. The switching power supply according to claim 1, wherein the frequency setting unit sets the variation range of the switching frequency by broadening the variation range in steps in accordance with corresponding steps between ranges of values of the voltage generated at the control terminal.

4. The switching power supply according to claim 1, wherein the external apparatus receives the output voltage from the voltage converter.

5. The switching power supply according to claim 1, wherein the frequency setting unit sets the variation range of the switching frequency in accordance with the input voltage.

* * * * *